Figure 4:
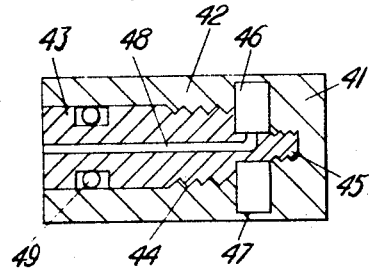

United States Patent
Nightingale et al.

[11] 3,747,479
[45] July 24, 1973

[54] PISTON ASSEMBLY

[75] Inventors: Douglas Daniel John Nightingale, St. Albans; Nigel Payne, Knebworth, Hertfordshire, both of England

[73] Assignee: Imperial Chemical Industries Limited, London, England

[22] Filed: Jan. 28, 1972

[21] Appl. No.: 221,612

Related U.S. Application Data

[63] Continuation-in-part of Ser. No. 97,282, Dec. 11, 1970, which is a continuation-in-part of Ser. No. 31,854, May 1, 1970, abandoned, which is a continuation of Ser. No. 590,236, Oct. 28, 1966.

[52] U.S. Cl. ............... 92/203, 92/202, 251/214, 251/368, 128/219, 128/274
[51] Int. Cl. ............... F16j 9/08, F16k 41/04
[58] Field of Search ............... 251/214, 368; 92/201-205; 277/102, 107, 116.8; 128/218 R, 218 P, 219, 273, 274, 234

[56] References Cited
UNITED STATES PATENTS

| | | | |
|---|---|---|---|
| 1,561,854 | 11/1925 | Hein | 128/219 |
| 1,589,881 | 6/1926 | Hein | 128/218 P |
| 2,394,687 | 2/1946 | Hein | 128/219 X |
| 2,895,773 | 7/1959 | McConnaughey | 128/218 P |
| 3,589,677 | 6/1971 | Segers | 251/368 |

FOREIGN PATENTS OR APPLICATIONS

| | | | |
|---|---|---|---|
| 342,777 | 7/1904 | France | 128/218 P |

Primary Examiner—Martin P. Schwadron
Assistant Examiner—David R. Matthews
Attorney—Cushman, Darby & Cushman

[57] ABSTRACT

A piston assembly comprises a sheath-like piston member, formed e.g. of PTFE, having a closed end integral with the side wall. Biasing means are located within the member for radially biasing an annular portion of the side wall against a surrounding cylinder to form a seal. Applications of the pistons include syringes and stopcocks.

14 Claims, 8 Drawing Figures

PATENTED JUL 24 1973
3,747,479
SHEET 1 OF 4
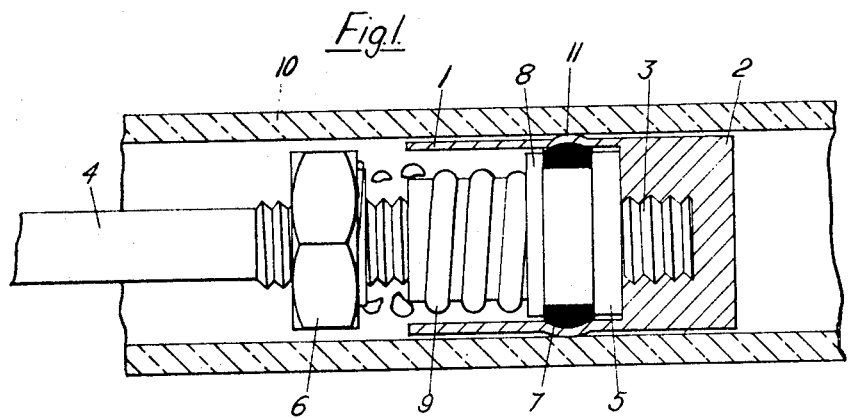
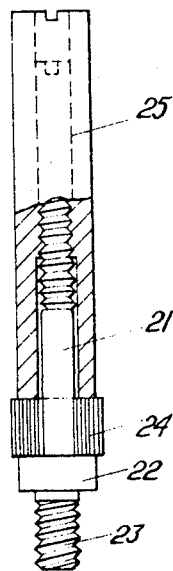
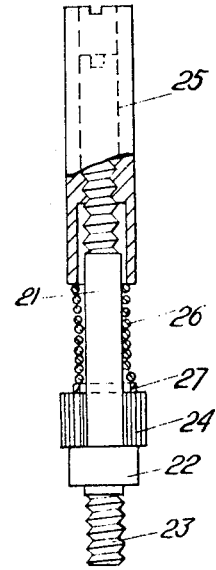
Inventor
DOUGLAS DANIEL JOHN NIGHTINGALE
NIGEL PAYNE
By
Cushman, Darby & Cushman
Attorneys

PISTON ASSEMBLY

This application is a continuation-in-part application of U.S. Ser. No. 97,282 filed on Dec. 11, 1970; which was a continuation-in-part application of U.S. Ser. No. 31,854 filed on May 1, 1970; (now abandoned) which was a continuation application of U.S. Ser. No. 590 236 filed on Oct. 28, 1966. This application is also related to U.S. Ser. No. 103,990, filed on Jan. 5, 1971, which application is in turn a continuation-in-part application of said Ser. No. 31854.

This invention relates to piston assemblies having a novel seal.

Polytetrafluoroethylene (PTFE) seals in which a collar of PTFE is inserted between the outer cylinder and the moving piston are known and have been used where a chemically inert seal is required. The PTFE seals must be machined accurately to provide a good seal, and being a close fit in the cylinder are easily damaged during assembly or removal for cleaning. During use, the PTFE tends to creep, reducing the efficiency of the seal, and a second collar (e.g. of rubber) may therefore be required to maintain the seal, but the advantage of the chemical inertness of the PTFE is then lost. The seal provided in assembly of the present invention does not require such accurate machining of the moving parts and remains effective without the need of a second sealing device of a less chemically resistant material.

According to the present invention we provide a piston assembly for sliding engagement within a cylinder, comprising
  a sheath-like hollow piston member formed from a chemically inert polymer, having a side wall and a closed end integral with said side wall, and
  biasing means located within said member for radially biasing an annular portion of said side wall against said cylinder to form a seal.

The annular portion, the closed end and that part of the side wall which exists between the portion and the side wall, have a common and continuous outer surface, thereby forming the sheath-like shape of the member. The annular portion may be adapted to be distensible, e.g. by being thinner, and hence be clearly discernable. However, it is sufficient and more convenient in some cases to provide a sheath in which the side walls have a constant thickness and constant pliability. In the latter case, the annular sealing portion is distinguished as such by being that portion distended outwards rather than by any inherent distinction. The end of the sheath may be suitably reinforced, e.g. by making it thicker, as desired for any specific end use.

The material employed for the piston member should be chemically inert under the conditions in which it is to be used and sufficiently pliable to allow for the required distension of the annular portion. The preferred materials are the fluorine-containing polymers, in particular polytetrafluoroethylene (PTFE), polychlorotrifluoroethylene, polyvinyl fluoride, polyvinylidene fluoride and copolymers of tetrafluoroethylene containing a minor proportion of ethylene or hexafluoropropene. The fluorine-containing polymer may form part of a composition in which it is blended with other copolymers or filled with such materials as glass fibres, mica or metal oxides to improve the resistance to wear. Any additional material may be incorporated provided that at least the annular portion of the spindle remains sufficiently pliable to form a good seal against the valve body, and which preferably retains the low coefficient of friction. In this respect, it is preferable to use a fluorine-containing polymer with not more than 30 percent by volume of additional material based on the quantity of fluorine-containing polymer. The preferred material is a polymer containing PTFE.

Where the piston member is capable of being compressed, the diameter of the member may be made slightly larger than the internal diameter of the cylinder so that on insertion of the member into the cylinder, the member is compressed, compression of the annular portion of the member being resiliently resisted by reason of the support provided by the biasing means. Thus although the remainder of the side walls may contact the cylinder wall and provide some sealing effect, the seal which is effective where there is a high pressure difference is provided by the annular portion biased against the cylinder wall.

We prefer, however, to make the diameter of the piston member slightly less than the internal diameter of the cylinder, e.g. a sliding fit therein, the side wall being provided with a radially distensible annular portion, and the biasing means being adapted to distend the portion radially outwards to contact the cylinder and form the seal. The distensibility may generally be provided by employing a thin side wall, either locally over the area of the distended annular portion, or extended over a considerable length of the member.

The biasing means conveniently comprises an elastomeric material under compression and a wide range of elastomeric substances are suitable as it is sealed from contamination by the sheath-like piston member. Rubber is very suitable being both inexpensive and readily available. This may, for example, be in the form of a block of elastomeric material outwardly biasing a PTFE sheath-like piston against the surrounding cylinder walls. However, we find, particularly where elevated temperatures or high pressure differences are to be employed, that more satisfactory results may generally be obtained by employing an adjustable biasing means capable of outwardly distending the side walls by an adjustable degree, and hence when the piston member is assembled within the cylinder, of applying adjustable outwardly biasing forces.

For obtaining an adjustable distension, several methods are available. For example the sheath-like piston may be provided with screw threads arranged internally remote from the closed end to engage with an axially located screw, the end of the screw bearing on the elastomeric material so as to provide adjustable axial forces which radially distend the elastomeric material, the annular portion being correspondingly distended in turn by the elastomeric material. This method does, however, tend to axially stretch the side walls, particularly where elevated temperatures are used, and for many applications such a simple system may not be satisfactory.

We therefore generally prefer to use a biasing means comprising a mandrel, a length of elastomeric tubing mounted on the mandrel and two engagement members for engaging the two ends of the elastomeric tubing, the engagement members being mounted coaxially on the mandrel and connected thereto, either directly or indirectly, such that the distance between the engagement members is adjustable, whereby adjustment of the position of the engagement members may produce a variation in the distension of the elastomeric tubing. In this way the reactive axial forces may be confined to the mandrel rather than to the relatively soft distensible annular portion. An engagement member may, for example, be an internally threaded sleeve or a nut engaging the mandrel by means of screw threads so that the elastomeric tubing may be axially compressed by screwing the engagement member along the mandrel, towards the other engagement member situated at the remote end of the tubing. The axial compression of the elastomeric tubing produces a consequential radial expansion which is used to distend the annular portion.

To avoid transmitting a torque to the elastomeric tubing, it is generally preferable to connect the engagement member indirectly to the mandrel, so that it may be adjusted using screw threads without being turned itself. Thus for example, an engagement member may be simply a washer or a cylindrical bush, whose position along the mandrel is determined by an adjusting means such as a nut or the like, engaging screw threads on the mandrel, and located on the side of the engagement member remote from the elastomeric tubing.

For ease of assembly and operation, it is convenient to provide one movable engagement member with the other member immovably secured to the mandrel or integral therewith. This other member may be provided by an enlargement of the diameter of the mandrel at one end or part way along its length, to form for example a shoulder against which this tubing may be compressed, the position of the enlargement being dependent on the position of the annular sealing portion relative to the position of the mandrel.

The width required for the annular sealing portion will depend on the use to which the piston is to be put, but generally only a narrow portion is required. For example, for a PTFE piston member having a diameter of about 7.5 mm, a distended annular portion of only about 3 mm will generally produce an efficient seal. Hence only a short length of elastomeric tubing is generally required. For most lengths of tubing, the radial distension may be provided by merely axially compressing the tubing by moving together the engagement members. However, for very short lengths of tubing, e.g. for O-rings, it is preferable for the distending means to be arranged so as to apply to the O-ring, radial stresses in addition to or instead of the axial compressive stresses. A preferred means for distending an O-ring or similar very short length of tubing, is one in which at least one of the two engagement members has coaxial with the mandrel, a frusto conical face for engaging the elastomeric tubing, the smaller diameter of the cone being directed towards the other engagement member. Hence an O-ring having an internal diameter of about the smaller diameter of the frusto cone and mounted thereon, may be forced by the closing of the two engagement means onto the region of larger cone diameter, and in this manner distended outwards. Preferably, both engagement members are frusto conical with their smaller diameters directed towards each other. For other than O-rings and similar very short lengths of tubing, however, it is generally preferred to rely only on axial compression of the tubing in order to avoid an increased radial bias at the outer ends of the elastomeric tubing.

We prefer to be able to apply the distension after insertion of the piston within an outer cylinder so as to reduce the risk of damage to the surface of the sheath. Furthermore, particularly when the piston assembly is to be used at elevated temperatures, it is often advantageous to be able to adjust the distension while maintaining the seal between the piston and the surrounding cylinder. These adjustments are readily obtainable for example by extending beyond the confines of the surrounding vessel one or more of the mandrel, an engagement member and/or the adjusting means where separate adjusting means are used.

To assist in the adjustment of the distension, e.g. by rotation of the adjusting means, the mandrel may be secured to the piston member by means of an integral screw extending axially at one end, the screw being arranged to engage an internally threaded hole therefor in the closed end of the member so as to prevent relative rotation. Similarly, where the engagement is only to prevent relative rotation, the enlargement of the mandrel may be made non-circular, with a corresponding shaped depression being provided in the closed end of the member to receive the enlargement. Where the end of the mandrel is screwed to the closed end of the piston member, the enlargement is not strictly necessary in that the closed end of the member may be used for compressing the elastomeric material in like manner. However, all the axial stresses are then applied to the screw threads of the softer material of the member where these engage those of the mandrel. To avoid failure of such threads, the use of an engagement member integral with the mandrel is generally preferred.

In a driven piston assembly, connecting means may be employed in the usual manner for manual operation or for connecting the piston member to external devices, whether such devices be the driving means, e.g. as employed in pumps, or whether they are to be driven by forces applied to the closed end of the member, e.g. employed in various forms of motor. The connecting means may be attached either to the piston member itself, or to a biasing means secured within the hollow member. Thus for example, the piston member may be provided at its open end with inward-facing screw threads for engaging the connecting means. Generally, however, we find it more satisfactory to attach the connecting means to the biasing means.

For any such piston in which the connecting means is connected to the biasing means, it is preferable to secure the biasing means in some way, to the piston member. This is particularly so where vacuum is to be applied to the closed end of the piston member. We have found, for example, that when the piston member is in the form of a PTFE sheath used simply to cap the biasing means application of vacuum to the closed end of the piston member will often cause the sheath to be sucked off the biasing means unless provision is made for its retention. Where the end of the mandrel is screwed into a thickened closed end of the sheath as described hereinabove, this will generally ensure retention of the sheath.

However, it is not always convenient to screw the mandrel into the closed end of the piston assembly, since this necessitates forming the seal some distance remote from the closed end, and allows fluid materials to be retained in the dead space between the side of the piston member and the cylinder wall: an undesirable situation where accurate quantities of fluid are to be metered. We have found that this problem may be overcome sufficiently for most applications by providing in the inner surface of the side wall an annular groove coplanar with the annular sealing portion, the biasing means having a resilient annular supporting member locatable within the groove so as to provide a resilient support for the annular sealing portion and to prevent withdrawal of the biasing means from the piston member. For example, the biasing means may comprise a rigid core having an annular recess and be provided in the recess with a toroidal spring capable of expanding into the groove so as to bridge the gap between the recess and the groove while distending the annular portion at the bottom of the groove. However, such a piston does not provide for adjustment, and while it is suitable for some applications, we prefer the adjustable biasing means described above.

A preferred piston therefore comprises an outer sheath enclosing an elastomeric O-ring having a smaller diameter than the internal diameter of the sheath, and means for radially distending the O-ring, the internal surface of the sheath being provided with an annular groove adapted to receive the O-ring when the O-ring is radially distended. The O-ring may have any desired cross-section, a circular cross-section generally being convenient. By making the O-ring of a smaller diameter than the internal diameter of the sheath the piston may readily be assembled and taken apart as required. On distending the O-ring into the provided annular groove, an annular portion of the sheath may be outwardly distended to contact the walls of a surrounding cylinder and form a seal, while at the same time the O-ring and distending means are prevented from being withdrawn from the sheath. The means which we prefer for distending the O-ring comprises two relatively movable, opposing frusto-conical faces supported on a coaxial mandrel, as described hereinabove.

The groove may be located adjacent the closed end of the sheath, and so by reducing the thickness of the closed end, at least around its periphery, dead space may be minimised. The precise shape of the closed end required for minimum dead space will naturally depend on the shape of the end of the cylinder within which it is enclosed, but although such configuration provides a means for obtaining a very small dead space, it need not be confined to such requirements. By virtue of this ability to form the annular seal adjacent the end of the piston and minimise dead space capable of retaining fluids between the piston and the bore, quantities of fluids may readily be metered with improved accuracy. Wastage of the fluid by retention when metering single charges, and contamination of successively metered quantities of different compositions may also be minimised. Hence the piston assembly is particularly suitable for use in syringes or metering pumps where accurately measured quantities of fluids are to be discharged, for example in chemical analysis apparatus, such as gas chromatography or gel permeation apparatus. The assemblies are also suitable for use in metering and handling liquids and gases over a wide range of pressures.

This method of retaining the protective sheath for capping the end of the piston while using it to form the seal, may also be employed with advantage under circumstances where the minimisation of dead space is of little or no importance. To adapt the device for such other uses, the closed end may be shaped, reinforced, elongated or otherwise modified as required provided this does not interfere with the formation of the seal formed by biasing the annular portion against the outer vessel, and further provided it does not destroy the continuity of the protective layer around the biasing means, extending from the annular sealing portion around the closed end of the sheath.

For example, the piston assembly may be used with advantage in a control valve where the principal operating mode is one of axial motion, such as in a valve where the closed end of the sheath is engageable with a seat coaxial with the piston. In such valves, while the flow passage is opened or closed by the nose of the valve, a gland seal is required between the spindle and the valve body, which seal is generally located well clear of the flow passage. Thus to adapt the piston assembly for use in such a valve, the closed end of the sheath may be elongated to form a solid nose, while the manner of forming the gland seal and of simultaneously retaining the sheath remains unchanged. Furthermore, although the principle operating mode is one of axial movement as the nose is extended into or withdrawn from the flow passage, the manner in which such action is effected is commonly a screw action in which the spindle is also rotated. Such action may equally well be used in the present context, and so it will be realised that while the annular locating groove is primarily to provide for the retention of the sheath during axial movement of the piston assembly, there may also be some rotational motion, either incidental or intentional, occurring during normal operation of the piston assembly.

In order that the invention may be more clearly understood, specific embodiments thereof will now be described by way of illustration, with reference to the accompanying drawings.

In the drawings

Figure 5:
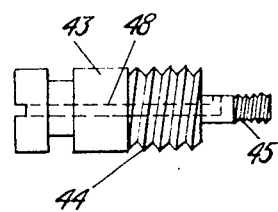
Figure 6:
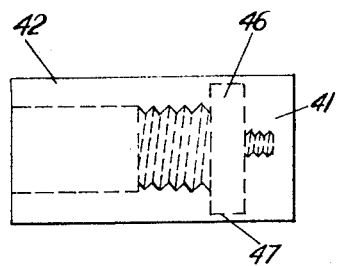
Figure 7:
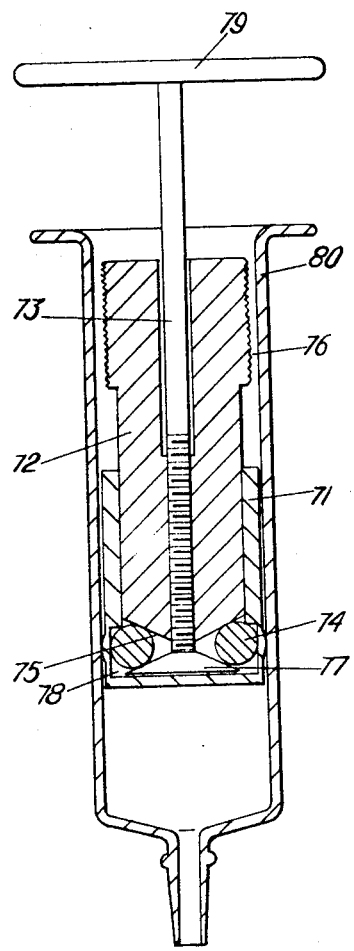
Figure 8:
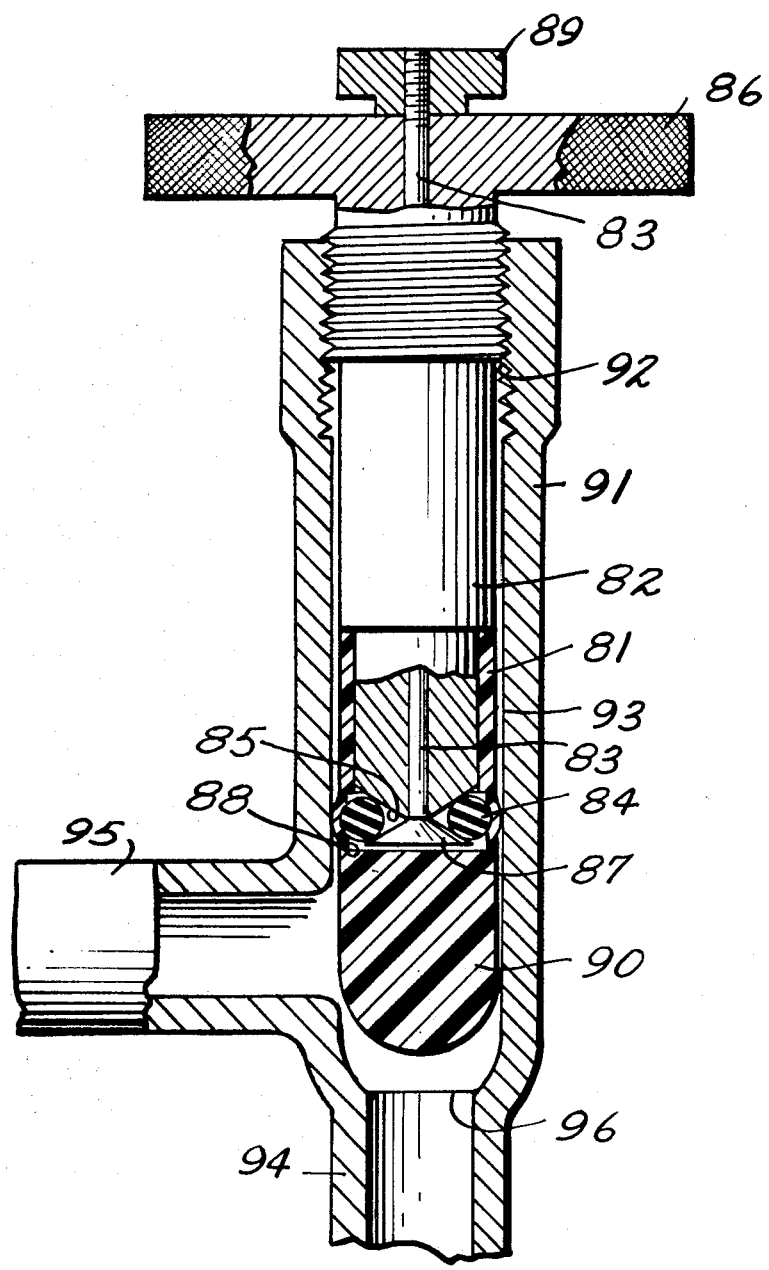

FIG. 1 is a longitudinal section through a piston assembly,

FIGS. 2 and 3 are partial sections through two biasing means suitable for use in piston assemblies, FIG. 4 is a section through a piston assembly in which the annular portion is distended by fluid pressure, FIGS. 5 and 6 show separately the two parts shown assembled in FIG. 4, FIG. 7 is a longitudinal section through a syringe capped by a PTFE sheath, and FIG. 8 is a longitudinal section through a stopcock having a spindle capped by a PTFE sheath, distended and retained in the manner illustrated in the piston of FIG. 7.

The piston assembly shown in FIG. 1 comprises a piston member 1 formed from a block of PTFE. The closed end 2 of the member is drilled and tapped to receive a screw-threaded extension 3 of a mandrel 4. The mandrel 4 has an enlargement 5, and is further threaded to engage a nut 6. A short length of rubber tubing 7 encircles the mandrel, and is located between the enlargement 5 and a washer 8. There is a compression spring 9 between the nut 6 and the washer 8. The piston assembly is located within a cylinder 10. In order to obtain and adjust the seal, the nut 6 is rotated with respect to the mandrel 4 so as to compress the rubber tubing against the enlargement causing it to distend radially, and in its turn to radially distend an annular portion 11 of the piston member to contact the cylinder.

The biasing means illustrated in FIG. 2 comprises a mandrel 21 having an enlargement 22 and a screw-threaded extension 23 for engaging the closed end of a piston member (not shown) which may be essentially as shown in FIG. 1. A short length of rubber tubing 24 is mounted on the mandrel 21, and is compressed between the enlargement 22 and a screwed sleeve 25 which engages with the mandrel. The biasing means illustrated is not provided with any connecting means, and is therefore particularly suited to use in a free piston or a piston in which connecting means are attached directly to the PTFE piston member.

The biasing means illustrated in FIG. 3 is generally similar to that shown in FIG. 2, and like components are referred to by like numerals. However, additional features are a compression spring 26 and a washer 27 through which the compression forces are applied to the tubing 24.

While the springs 9 and 26 of FIGS. 1 and 3 are not essential, they provide for a more constant load to be applied to the tubing regardless of any creep in the PTFE. Likewise, effects due to differences in thermal expansion coefficients may be reduced when the piston is to be used at varying temperatures.

Using piston assemblies of the kind illustrated in FIG. 2 when used in precision bore glass tubing, we have readily obtained leakage rates better than $1 \times 10^{-7}$ torr $dm^3 sec^{-1}$ at pressure differences of 300 p.s.i., based on standard hydrogen/methanol tests. Leak rates better than $8 \times 10^{-8}$ torr $dm^3 sec^{-1}$ have been obtained using a litre vessel sealed from atmospheric pressure by the present seal, the pressure rising during the test from $10^{-4}$ to $2 \times 10^{-4}$ torr. Similar results may be obtained by the seals of FIGS. 1 and 3 provided suitable springs are used, and such spring devices may retain their ability to maintain the seal over widely fluctuating temperatures.

In the device of FIGS. 4, 5 and 6, a piston member, formed from a cylindrical block of PTFE, has a closed end 41 and a side wall 42. Within the member is a rigid core 43, secured to the piston member by two threaded sections 44 and 45. A pressure chamber 46 is thereby formed, the outer wall of which comprises the annular sealing portion 47. Through the core 43 leads a passage 48, and a pressure tight seal between the two components is provided by an O-ring 49. The core may also be of PTFE, or may be of any suitable structural material, e.g. a metal such as brass or a thermoset or thermoplastic material, e.g. nylon or acetal polymer.

The pressure chamber 46 is filled with fluid (preferably a liquid), and the pressure is applied via the passage 48. For instance, the walls of the passage 48 may be tapped with a threaded rod screwed into it to compress the fluid. Pressure exerted by the fluid in the pressure chamber causes the thin-walled annular portion to be distended, but stretching of the thin walls by pressure acting on the other walls of the pressure chamber is prevented by having the core screwed into the piston member by threads 44 and 45 on either side of the chamber.

The O-ring 49 which prevents leakage between the two units is particularly important when a brass core is used as there is a considerable difference in the coefficients of thermal expansion of brass and PTFE.

The syringe illustrated in FIG. 7 has a piston member comprising a PTFE sheath 71 within which is located a threaded sleeve 72 mounted on a mandrel 73, and an O-ring 74. The sleeve which is internally screw-threaded has a frusto-conical surface 75 at one end and the other end is provided with a knurled portion 76.

The mandrel 73 is screw-threaded over at least part of its length for engagement with the screw threads on the sleeve. The end of the mandrel has an inverted frusto-conical shaped enlargement 77 arranged such that its conical surface is adjacent the conical surface 75 of the sleeve. The diameters of the sleeve, the enlargement on the mandrel and the undistended O-ring are all slightly less than the internal diameter of the PTFE sheath. The internal surface of the sheath is provided with an annular groove 78. The mandrel is extended to allow it to be secured to a conveniently shaped operating member 79. The piston assembly is located within a syringe barrel 80 of known shape having a precision bore prepared by shrinking the glass barrel on to a polished former.

On assembly, the sleeve and mandrel, together with the undistended O-ring are inserted into the sheath until the mandrel enlargement abuts the closed end of the sheath. A small initial distention may then be applied to the O-ring to locate it within the groove 78 by rotating the sleeve with respect to the mandrel to draw together the two conical surfaces, the knurled portion 76 being provided to assist in gripping the sleeve. The spindle may then be inserted into the barrel where further distension is applied to the O-ring to outwardly distend an annular portion of the PTFE sheath to contact the walls of the barrel and form a seal between the piston assembly and the barrel.

If desired the full distention may be applied before insertion of the piston assembly within the barrel, but since this would render the distended annular portion of the sheath more liable to damage during assembly, application of the full distension after assembly is preferred.

In order to test the efficiency of the seal produced between the piston assembly and the barrel, the syringe described above and illustrated in FIG. 7 of the drawings, was modified by the attachment of a screw-adjustable brass holding device interconnecting the mandrel 73 and the barrel 80, such that the position of the piston within the barrel might be controlled and secured as required. The outlet of the syringe was connected to a 1 litre pressure vessel by a welded glass joint. The pressure in the pressure vessel was measured by a Pirani gauge, and air removed by a mercury vapour pump backed by a rotary oil pump providing an ultimate vacuum better than $1 \times 10^{-4}$ torr ($1.3 \times 10^{-2}$ Pa). The pressure of the system was measured both with the syringe incorporated in the system and with the syringe blanked off in order to determine the leak rate attributable to the syringe itself. After allowing the apparatus to degas, the pressure rise indicated by the Pirani gauge over a period of 16 hours was recorded in each case. The pressure rise attributable to leakage through the syringe over the period of 16 hours was $9 \times 10^{-4}$ torr (0.12 Pa). This represents a leak rate of $1 \times 10^{-8}$ torr $dm^3 s^{-1}$ ($1.3 \times 10^{-11}$ N m).

A second syringe of the kind described above and illustrated in FIG. 7 of the drawings, was again provided with a holding device having a screw adjuster for controlling and maintaining the position of the piston assembly with respect to the barrel. The outlet of the barrel, however, was provided with an injection needle having a 1 mm bore, attached to the barrel via a tap joined at its ends to the barrel and needle respectively by a Luer lock. The syringe was used to obtain liquid samples from a reaction vessel through a self sealing cap in the wall of the vessel. The reaction mixture was maintained at a pressure of 150 p.s.i. (10.4 bar). The needle was inserted through the cap, and with the tap open, the piston assembly was withdrawn until the desired sample had been taken from the vessel. The tap was then closed, and the needle withdrawn from the cap which resealed itself. A series of samples were taken and all at the same pressure of 150 p.s.i. (10.4 bar). No leakage past the seal between the piston assembly and the surrounding barrel was detected.

The stopcock illustrated in FIG. 8 has a spindle, the end of which incorporates a piston assembly substantially the same as that illustrated in FIG. 7. The spindle comprises a PTFE sheath 81 within which is located a bush 82 mounted on a mandrel 83, and an O-ring 84. The bush has a frusto-conical surface 85 at one end and the other end is provided with an integral knurled knob 86. The end of the mandrel inserted into the closed end of the sheath has a frusto-conical enlargement 87 arranged such that its conical surface faces the adjacent conical surface of the bush, with the O-ring located therebetween. The end of the mandrel remote from the enlargement is screw threaded and extends beyond the knurled knob 86, the extended part being screw threaded to receive a nut 89 having a knurled circular shape so as to facilitate manual adjustment. The diameters of the bush, the mandrel enlargement 87 and the undistended O-ring are all slightly less than the internal diameter of the PTFE sheath. The internal surface of the sheath is provided with an annular groove 88 adjacent its closed end. The sheath is extended considerably past the end of its hollow part to provide the spindle with a solid nose 90.

The spindle is located within a glass body 91 of known design which has been shrunk over a threaded former to provide screw threads 92 at one end. Corresponding threads are formed in the outer surface of the bush for engagement therewith. The valve body has a smooth bore 93 and provides a flow passage between two tubes 94, 95 extending from the body, one of the tubes having a valve seat 96 coaxial with the spindle.

As for the piston illustrated in FIG. 7, the valve spindle is preferably inserted into the smooth bore of the body before the conical faces of the engagement members are drawn together sufficiently to cause distension of the PTFE sheath. Distention is then brought about by further rotation of the nut 89 so as to draw up the mandrel through the bush. The cones force the O-ring outwards as they are drawn together, and this in turn radially distends the annular portion of the sheath which bounds the groove, until it presses against the bore wall of the valve body to form a gland seal. To operate the valve itself, by rotation with respect to the valve body of the knurled knob and hence of the spindle generally, the nose is advanced towards, or drawn away from the valve seat 96 by virtue of the engaging threads 92. Fluid flow through the tubes 94, 95 may thus be controlled by restriction at the valve seat as required.

Seals of the kind used in the syringe and in the stopcock shown in FIGS. 7 and 8 respectively, having PTFE sheaths in which the annular portions bordering the grooves were distended by internal elastomeric O-rings which were themselves outwardly distended, and using rigid smooth precision bores, e.g. of glass, steel or the like of a suitable thickness to withstand the applied pressures, have been tested by applying a high pressure on the side of the seal to which only the continuous PTFE layer at the closed end of the sheath presented itself, with the other side of the seal remote from the closed end of the sheath maintained at atmospheric pressures. We found we could provide a seal capable of withstanding elevated pressures of the order of 300 to 400 p.s.i. (20.7 to 27.6 bar) at a leak rate as low as $10^{-7}$ torr dm$^3$ s$^{-1}$ ($1.3 \times 10^{-10}$ N m).

The valve body 91 may be formed from rigid materials other than glass, as required. Metal bodies are particularly convenient where the valve is to be incorporated into metal plant. With metal valves, it is generally more convenient to provide screw threads on the outer surface of the body, the knob downwardly extended to form a cap, and the threads for engagement with those on the outer surface of the body being formed in the inner surface of the cap so formed. In this manner, the height of the valve may be reduced since the screw threads may then be formed in the same region as the precision bore where the gland seal is formed. Such an arrangement may also be used in a glass body, but with glass it is more difficult to produce the screw threads and a precision bore over the same length of glass tubing. Hence the shape of body illustrated in FIG. 8 is preferred when using glass on account of the greater ease of manufacture.

By fabricating the sheath from a fluorine-containing polymer such as PTFE, a good seal may be produced while allowing the piston to be a sliding fit within the outer vessel. Furthermore, any vulnerable part of the piston is protected from corrosive materials by the sheath. Thus the piston is particularly suitable for handling corrosive fluids, e.g. by being incorporated into a pump for circulating the fluids. Each piston assembly may have more than one annular sealing portion if desired, but this is generally not necessary, particularly where a seal is used in which the radial distention is adjustable.

We claim:

1. A piston assembly for sliding engagement within a cylinder, comprising a sheath-like hollow piston member formed from a chemically inert polymer having a continuous and integral side wall and end portion, said end portion being adapted to contact a fluid upon which the piston is to operate, and biasing means located within said member and comprising an elastomeric material compressible against a coplanar annular portion of said side wall for radially biasing said annular portion of said side wall against said cylinder to form a seal, said biasing means being adjustable while maintaining a seal between the annular sealing portion and the cylinder, said biasing means and said adjusting means being on the side of the formed seal opposite the side where the end portion is disposed so as to isolate said biasing means and said adjusting means from said fluid.

2. A piston assembly according to claim 1 in which the biasing means comprises a mandrel, a length of elastomeric tubing mounted on the mandrel and two engagement members for engaging the two ends of the elastomeric tubing, the engagement members being mounted coaxially on the mandrel and connected thereto, either directly or indirectly, such that the distance between the engagement members is adjustable.

3. A piston assembly according to claim 2 in which one engagement member is movable along the mandrel while the other engagement member comprises an enlargement of the diameter of the mandrel forming a shoulder against which the elastomeric tubing may be axially compressed by the movable engagement member.

4. A piston assembly according to claim 2 in which the tubing is of short length being substantially an O-ring, at least one of the two engagement members having a frusto-conical face coaxial with the mandrel, the smaller diameter of the cone being directed towards the other engagement member, wherein the O-ring located between the two engagement members may be radially distended by penetration of the conical surface thereinto as the engagement members are moved towards each other.

5. A piston assembly according to claim 4 in which one engagement member is movable along the mandrel while the other engagement member is integral with the mandrel.

6. A piston assembly according to claim 2 in which means for adjusting the distance between the engagement members are extendable beyond the confines of the surrounding vessel while the annular sealing portion is retained within the cylinder, whereby adjustment of the distention may be effected while maintaining a seal between the piston and surrounding cylinder.

7. A piston assembly according to claim 5 in which the mandrel has an integral screw extending axially from one end thereof, the screw being arranged to engage an internally threaded blind hole therefor in the closed end of the piston member, whereby the mandrel may be secured to said piston member.

8. A piston assembly according to claim 1 in which the inner surface of the side wall has an annular groove coplanar with the annular sealing portion, the biasing means having a resilient annular supporting member locatable within the groove so as to provide a resilient support for the annular sealing portion and to prevent withdrawal of the biasing means from the piston member.

9. A piston assembly according to claim 8 comprising an outer sheath enclosing an elastomeric O-ring having a smaller diameter than the internal diameter of the sheath, and distending means for radially distending the O-ring, the internal surface of the sheath being provided with an annular groove adapted to receive the O-ring when the O-ring is radially distended.

10. A piston assembly according to claim 9 in which the groove is formed adjacent the closed end of the sheath.

11. A piston assembly according to claim 8, which is adapted to form the spindle of a control valve in which the principle mode of operation is one of axial motion of the spindle within the valve.

12. A piston assembly according to claim 1 in which the piston member is formed from a material containing polytetrafluoroethylene.

13. A syringe comprising a cylindrical barrel and a plunger slidable within the barrel, the plunger comprising a piston assembly as claimed in claim 1, having an operating member attached to or integral with the biasing means, said operating member extending beyond the confines of the barrel to enable movement of the plunger within the barrel to be effected.

14. A pump having a cylinder and a piston slidable therein, the piston comprising a piston assembly as claimed in claim 1, the biasing means having integral therewith or connected thereto a connecting rod for controlling reciprocation of the piston with respect to the cylinder.

* * * * *

UNITED STATES PATENT OFFICE
CERTIFICATE OF CORRECTION

Patent No. 3,747,479　　　　　　　　Dated July 24, 1973

Inventor(s) Douglas Daniel John Nightingale and Nigel Payne

It is certified that error appears in the above-identified patent and that said Letters Patent are hereby corrected as shown below:

In the Heading, following,

"[21] Appl. No.: 221,612", insert

--[30] Foreign Application Priority Data

October 28, 1965　Great Britain　45,785/65

December 7, 1965　Great Britain　51,870/65

December 15, 1969　Great Britain　60,996/69--

Signed and sealed this 5th day of February 1974.

(SEAL)
Attest:

EDWARD M. FLETCHER, JR.　　　　RENE D. TEGTMEYER
Attesting Officer　　　　　　　　Acting Commissioner of Patents